United States Patent

[11] 3,622,026

[72] Inventor Harold Tornheim
 430 N. Auburn Ave., Sierra Madre, Calif. 91024
[21] Appl. No. 861,128
[22] Filed Sept. 25, 1969
[45] Patented Nov. 23, 1971
 Continuation-in-part of application Ser. No. 749,358, Aug., 1968, now Patent No. 3,522,894. This application Sept. 25, 1969, Ser. No. 861,128

[54] TRUCK
 7 Claims, 12 Drawing Figs.
[52] U.S. Cl. ................................................ 214/501,
 214/75 H, 214/515
[51] Int. Cl. ............................................... B60p 1/04
[50] Field of Search ................................... 214/501,
 505, 515, 517, 621, 38.8, 38.22, 75 H

[56] References Cited
UNITED STATES PATENTS
| | | | |
|---|---|---|---|
| 2,251,435 | 8/1941 | Anthony | 214/501 X |
| 2,412,158 | 12/1946 | Kuehlman et al. | 214/515 X |
| 2,550,230 | 4/1951 | Dalton | 214/505 |
| 2,606,673 | 8/1952 | Young | 214/38 BA |
| 2,630,929 | 3/1953 | Pearson | 214/505 |
| 2,703,658 | 3/1955 | Bazzell | 214/505 |
| 3,155,248 | 11/1964 | Haller | 214/501 X |
| 3,355,043 | 11/1967 | Talbert | 214/501 |

Primary Examiner—Albert J. Makay
Attorney—Christie, Parker & Hale

ABSTRACT: A pickup truck has an inclinable carriage pivotally mounted on the truck chassis. Power means incline the carriage to substantially vertical position. The including means preferably includes a transverse torsion shaft forward the carriage pivot point and a rotatable by hydraulic cylinders. Linkages between the ends of the torsion shaft and the carriage rotate the carriage in response to the rotation to the shaft. In the vertical position, the carriage can, through a variety of coupling means, take on alternatively a variety of attachments to the truck. Generally, the attachments to the truck are such that they, in turn, in taking on freight for transportation, take advantage of the inclinability of the carriage. One attachment is a track and trolley assembly that takes on freight by the inclination of the carriage. Another attachment is an overhead rack that, in its inclined position, a man standing on the ground can load.

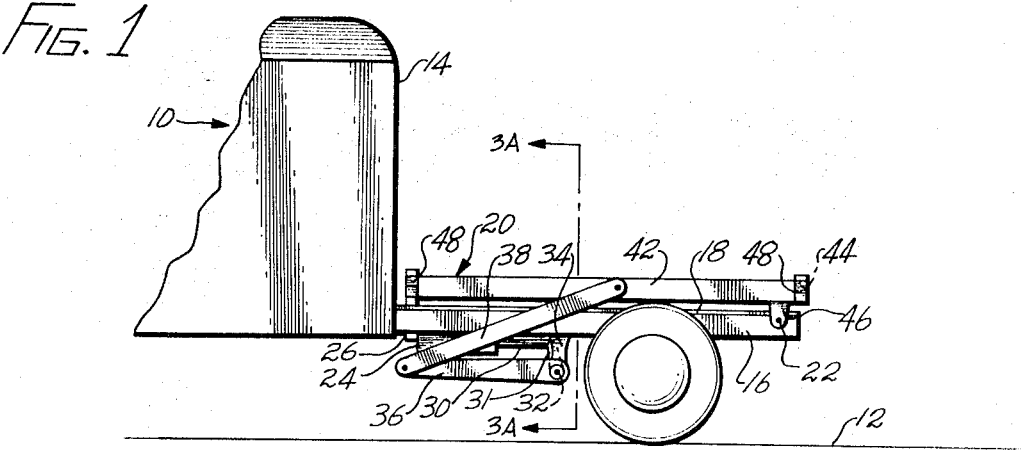
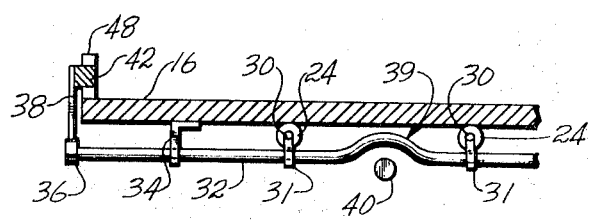
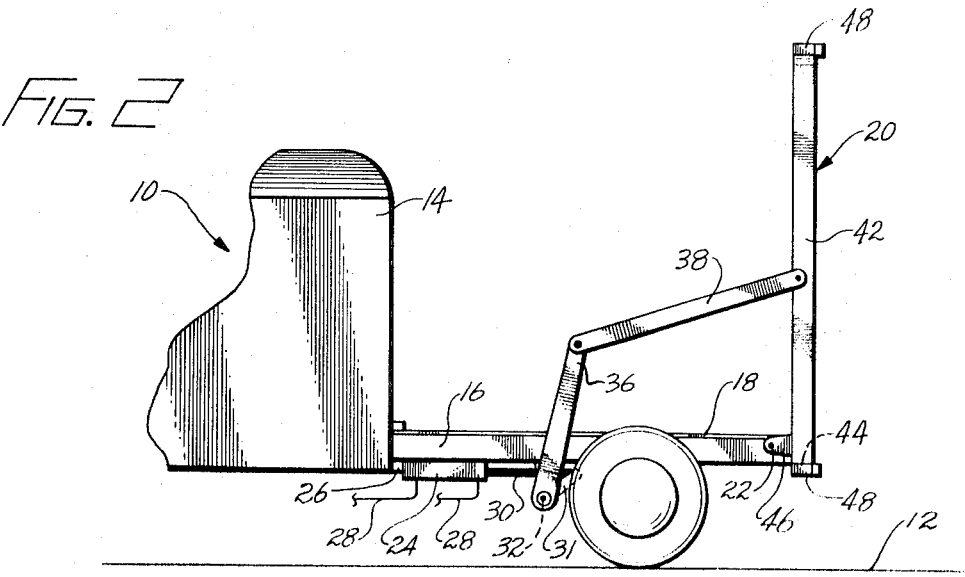

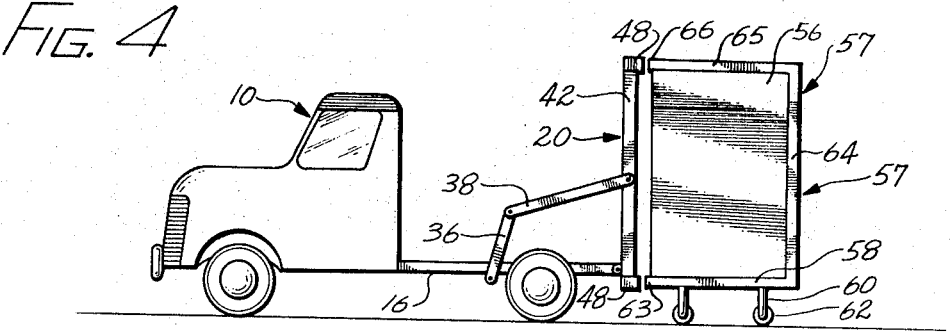
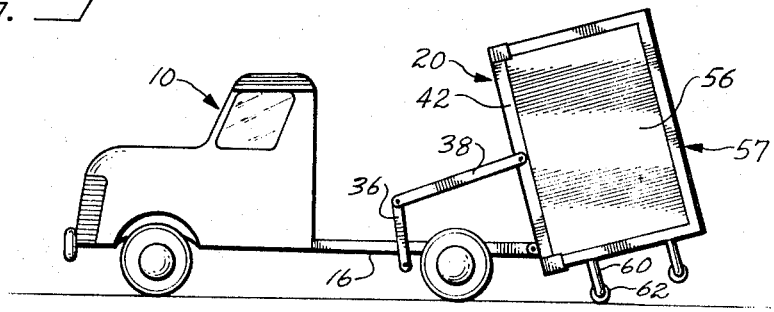
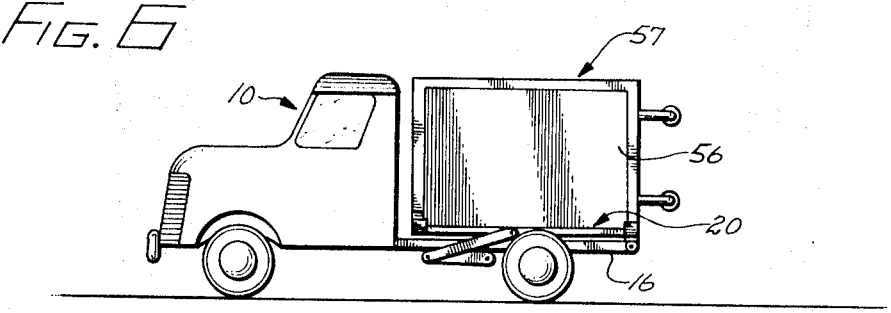
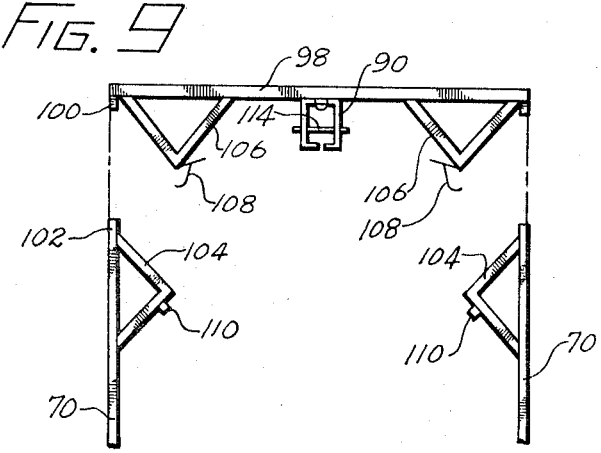
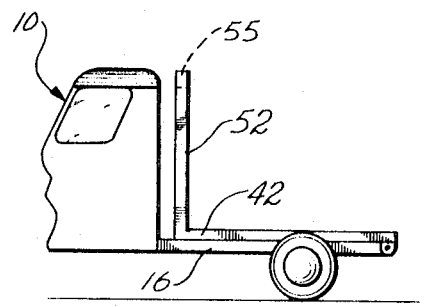

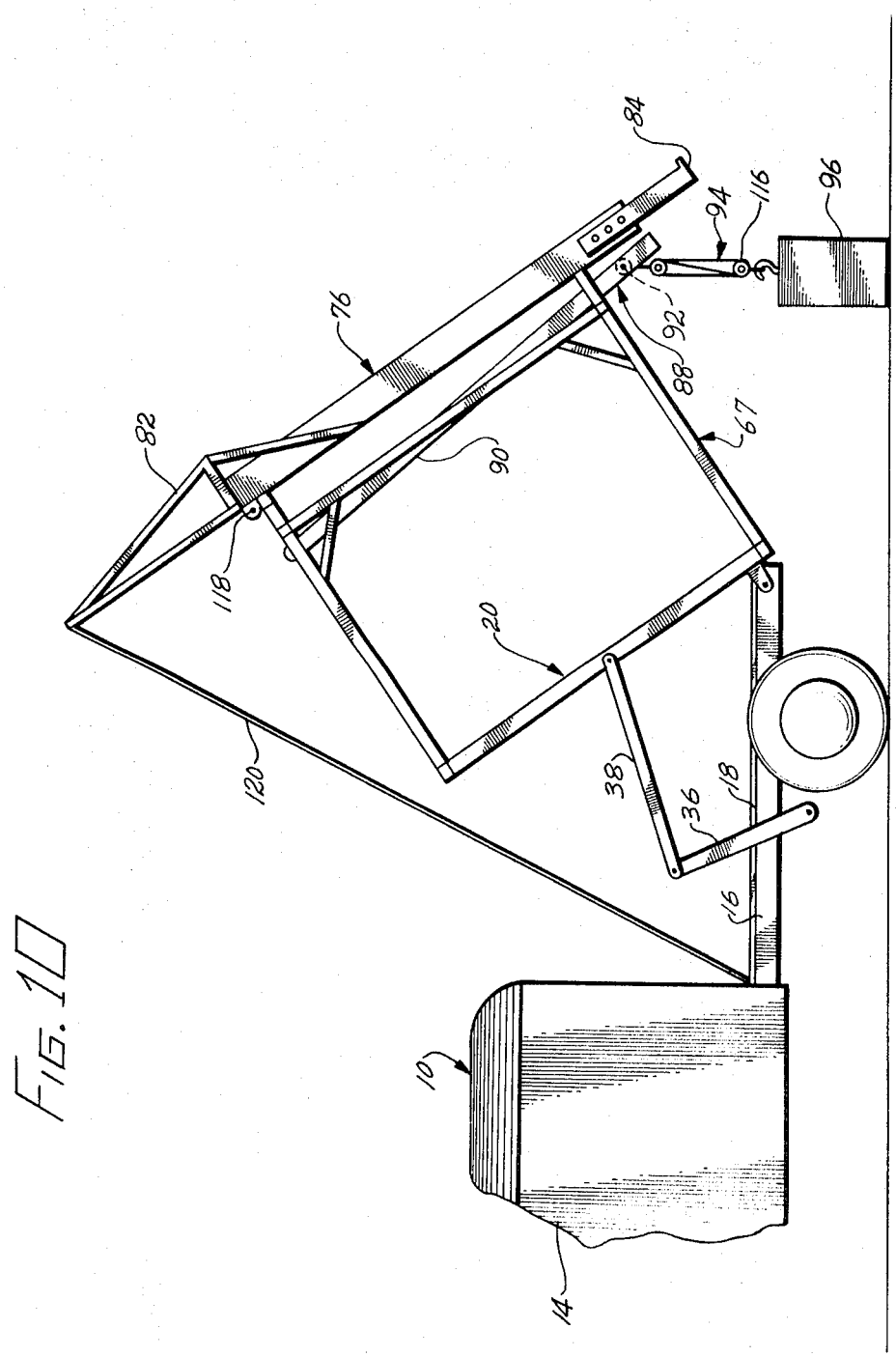

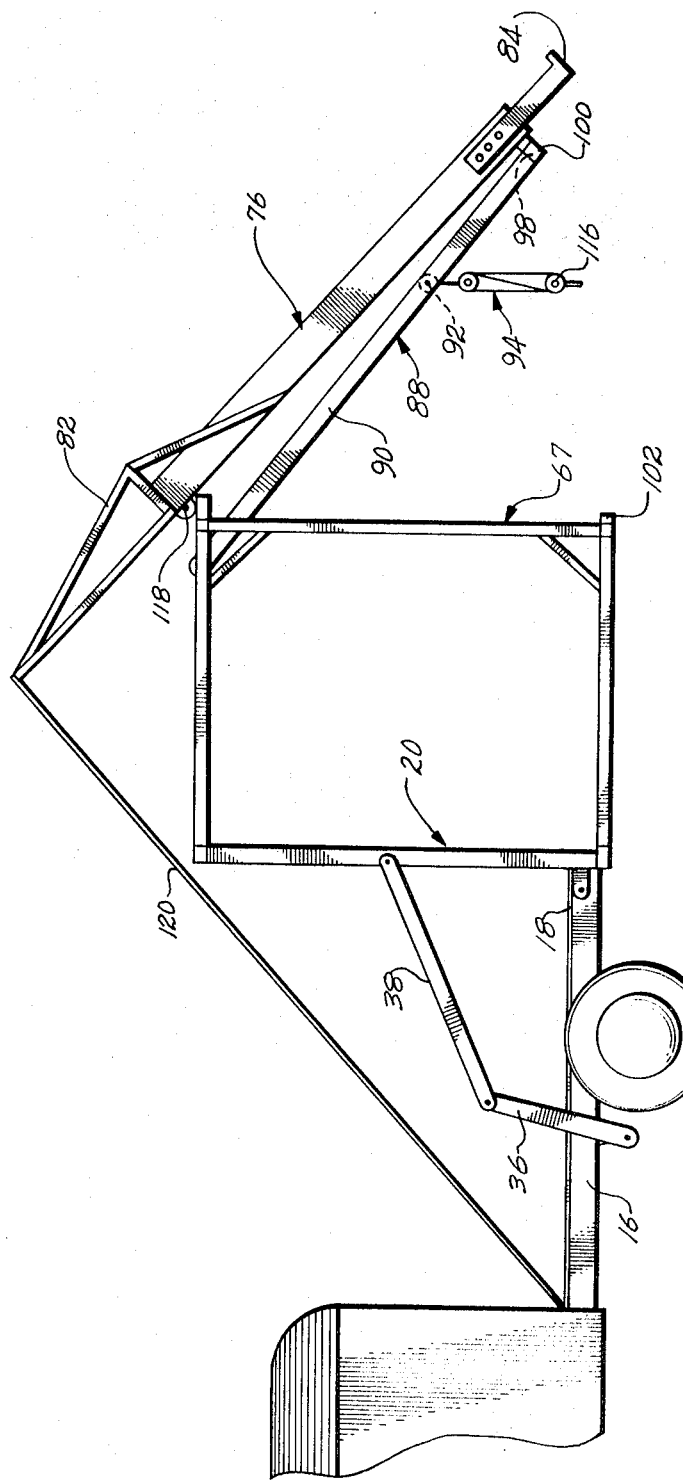

TRUCK

CROSS-REFERENCE TO RELATED APPLICATION

This application is a continuation-in-part of application Ser. No. 749,358, filed Aug. 1, 1968 now Pat. No. 3,522,894.

BACKGROUND OF THE INVENTION

1. Field of the Invention

This invention relates to trucks having an inclinable carriage or bed, and more particularly, to a truck having a carriage inclinable to a substantially vertical position. A number of attachments to the truck are alternatively mountable onto the carriage when the carriage is in this vertical position.

2. Description of the Prior Art

A pickup truck is a versatile vehicle, which numerous commercial organizations as well as private individuals employ. It can transport miscellaneous objects of freight that fit the truck bed and are within the truck's load capacity. Equipped with a tailgate lift, the truck can take on some of these objects much more easily. Equipped with an overhead rack extending over the cab, the truck can transport long objects such as ladders, planks, and lengths of pipe. Alternatively supplied with a roof and sidewalls extending to the roof, the truck becomes a van. A camper is a type of van furnished as living quarters.

A serious obstacle to the full exploitation of the truck's versatility is the difficulty of loading and unloading heavy objects. Loading the overhead rack, for example, requires one to lift the objects above the level of the cab in placing them on the rack. But even before the overhead rack can be used, it, too, is a heavy object that demands its unwieldy mounting onto the truck.

The loading of heavy objects onto the truck floor has heretofore required a ramp of planks for rolling the freight onto the floor or required a tailgate lift. Pushing the freight up a ramp of planks is difficult, physically exhausting, and in many cases, impossible because of the weight of the objects being handled. A conventional tailgate lift is a permanent and expensive accessory.

A conventional inclinable-bed truck, in contrast to a common pickup truck, is used almost exclusively for the transportation of bulk materials and for their unloading by dumping. A truck of this type is of minimal value in the unloading of fragile material and of objects that should not be dumped. The inclinable-bed feature of the truck thus is currently neither available for loading nor for unloading other than by dumping.

As a consequence, a pickup truck generally transports freight without any aids for the loading of freight. An inclinable-bed truck has an advantage only if the freight is dumpable. No currently available truck is known to have an inclinable bed capable of taking on and of discharging fragile objects of freight. Conventional modifications of pickup trucks result in the incorporation of complex and expensive accessories that are both limited in their capability and difficult to mount and demount to and from the truck.

SUMMARY OF THE INVENTION

Briefly, this invention provides an improved truck having a carriage pivotally mounted on the truck chassis. The carriage is inclinable to a substantially vertical position, and in this position, coupling means mount and demount a variety of alternative attachments to and from the carriage. Generally, the purpose of the attachments is to transport freight, and the inclination of the carriage part way facilitates in the loading and the unloading of freight. During loading, for example, an attachment secures objects of freight to the carriage when the carriage is in its inclined position and while the carriage returns to the horizontal position in response to the inclining means.

The preferred form of the inclinable carriage is a pair of longitudinal beams free at their front ends. An optional permanent addition to these beams is a structure comprising a post secured to the front end of each beam and a transverse beam rigidly connecting the tops of the pair of posts together.

The preferred form of the carriage inclining means includes a rotatable transverse shaft forward of the carriage pivot point. Preferably, the shaft is rotated by hydraulic cylinders. Linkages between the ends of the shaft and the carriage rotate the carriage in response to the rotation of the shaft.

The improved truck of this invention accommodates a variety of attachments, thereby making the truck a versatile vehicle. One of the attachments may be a shell-like structure having a bed and sidewalls. This attachment makes the truck a dump truck because of the inclinable nature of the carriage. Another attachment may be a shell in the form of a boxlike structure. This converts the truck into a van. Another attachment may be a camper. Further attachments include a track and trolley assembly for hoisting freight onto the truck, an overhead rack for transporting long objects of freight such as ladders, planks, and lengths of pipe, and a structure for facilitating the transportation of special freight, such as panes of glass.

One of the stated alternative attachments is that with a conventional track and trolley assembly carrying a rope or chain hoist overhead above the floor of the truck. The track preferably slopes down toward the front of the carriage when the carriage is horizontal. As the carriage inclines, the rear end of the track extends farther rearward, so that the hoist at the rear of the track moves intentionally directly over an object of freight on the ground. Returning the carriage to its horizontal position lifts the object, having been manually secured to the hoist, off the ground. As the carriage approaches its horizontal position, the track levels and then slopes down toward the front of the carriage. As a consequence, the object not only rises to the level of the truck's floor, but gravity also rolls the trolley to move the object forward to the desired location on the truck. The apparatus of this attachment can also discharge freight by the reverse of this procedure.

In a modification of the attachment described above, the track can rotate about a pivot at its front end. A boom rigidly attached to the track extends forward of the pivot and over the cab of the truck. A snubbing line preferably connects a point on the boom with a point on the chassis of the truck to prevent the track from inclining completely with the carriage into the vertical position of the carriage.

Another one of the stated alternative attachments is that with a rack similarly overhead. Inclining the carriage brings the rear end of the rack nearer to the ground, so that a man standing on the ground can load on freight into the rack easily. This attachment is also amenable to the rotatable modification of the track and trolley attachment described above. An explicit boom may not be necessary since the rack itself may extend far enough over the cab.

The improved truck of this invention is advantageous because it makes a pickup truck with a special inclinable carriage highly versatile. The single truck can become a variety of kinds of trucks, and the truck can take on a variety of freight with facility. All of the energy for taking on attachments and freight comes from the motion of the inclining carriage.

BRIEF DESCRIPTION OF THE DRAWINGS

These and other aspects of the invention will be more fully understood from the following detailed description and the accompanying drawings, in which:

FIG. 1 shows a side elevational view of a truck equipped with the preferred carriage inclining mechanism, the carriage being in a horizontal position;

FIG. 2 shows the truck of FIG. 1 with the carriage inclined to a vertical position;

FIG. 3A shows a sectional view taken on line 3A—3A of FIG. 1;

FIG. 3B shows an alternative embodiment of the inclinable carriage of FIG. 1;

FIG. 4 shows a side-elevational view of a truck with the inclinable carriage of this invention inclined to a vertical position in preparation for mounting an attachment onto the truck;

FIG. 5 shows the truck of FIG. 4 in the course of the mounting operation;

FIG. 6 shows the truck of FIG. 4 after the completion of the mounting operation;

FIG. 9 shows an end view taken on line 9—9 of FIG. 8;

FIG. 10 shows a side-elevational view of a truck equipped with an overhead rack and track and trolley combination with the carriage inclined; and FIG. 11 shows the truck of FIG. 10 with the carriage in the vertical position.

DETAILED DESCRIPTION OF THE PREFERRED EMBODIMENTS

Figure 7:
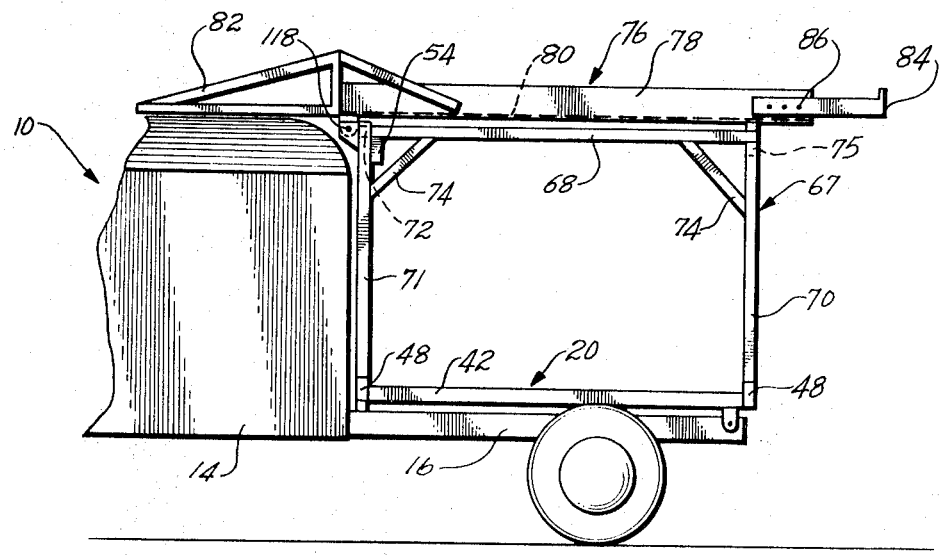
FIG. 7 shows a side-elevational view of a truck with an overhead rack and coupling means of this invention.

FIG. 1 shows a truck 10 parked on a ground 12. The truck has a driver's cab 14 at its front end and a chassis 16 extending from the cab toward the rear end of the truck. A floor 18 secured to the chassis, and hence not inclinable, serves as a landing for freight transported by the truck. A carriage 20 is inclinable between the horizontal position and the vertical position, about a pivot pin 22 in both its rear and the rear of the chassis 16.

A preferred embodiment of the mechanism inclining the carriage includes a pair of double-acting hydraulic cylinders 24, one on each side of the chassis 16, inclining the carriage 20 between the horizontal position shown in FIG. 1 and the vertical position shown in FIG. 2. A bracket 26 pivotally supports the front ends of the horizontally disposed hydraulic cylinders from the underside of the chassis at its front. An electric motor-driven hydraulic pump (not shown) operates the hydraulic cylinders. Hydraulic lines 28 extend rearward from the pump to deliver hydraulic fluid to the cylinders.

A horizontally driven ram 30 from each cylinder 24 pivotally connects at its end to a coupling 31 rigidly affixed to a laterally disposed torsion shaft 32 extending the width of the chassis 16. A pair of downwardly extending mounting brackets 34 connect to the underside of the chassis to support the torsion shaft for rotational movement about its axis during inclination of the carriage. Each end of the torsion shaft rigidly connects to the pivot of an elongated pivot arm 36. When the carriage 20 is in its horizontal position, each pivot arm 36 extends toward the front of the chassis substantially parallel to the chassis. A second elongated pivot arm 38 pivotally connects at one end to the free end of each pivot arm 36 and at its other end to the middle of the carriage 20.

To incline the carriage, the hydraulic rams 30 extend longitudinally toward the rear of the chassis 16 to rotate the torsion shaft 32 about its axis. As the torsion shaft rotates, the pivot arm 36 pivots upwardly, and through the coupling produced by the second pivot arm 38, the carriage is lifted. As seen in FIG. 4, the torsion shaft has an upwardly arcuate deviation 39 at its center to give the truck's drive shaft 40 ample clearance.

Alternatively, other mechanisms can incline the carriage. In one such mechanism (not shown), the hydraulic cylinders function by interposing between a pair of brackets (not shown) on the chassis 16 and the carriage 20. Another alternative inclining mechanism (not shown) can be a mechanical actuator, such as a screw drive.

A preferred embodiment of the carriage 20 is a framework including a pair of longitudinal beams 42 and a transverse beam 44 connecting the rear ends of the longitudinal beams 42 together. The longitudinal beams 42 are free at their front ends. A pivot bracket 46, one fixed to each beam 42, supports the rear end of each beam. The carriage has several pairs of sockets 48 vertically aligned to the horizontally positioned carriage shown in FIG. 1. The construction of the carriage may appear lacking in rigidity, but a mounted attachment and attachment coupling means (hereinafter described) provide substantial rigidity. Furthermore, the rear transverse beam 44 is still present, and equalizers (not shown) that may be present in the hydraulic lines energizing the pair of hydraulic cylinders also contribute to the rigidity. The preferred carriage-inclining mechanism, and particularly the torsion shaft 32, also contributes greatly to the rigidity of the preferred inclinable carriage.

Additional structural members permanently and rigidly tying the front ends of the longitudinal beams 42 together can greatly increase the rigidity of the carriage. Such an addition is necessary if the inclining mechanism itself is of such a nature that it does not contribute sufficiently to the rigidity. These additional members, shown in FIG. 3B, include a post 52 permanently fixed to the front end of each longitudinal beam 42. A transverse beam 55 connects the tops of the pair of posts 52 together. The reason that the transverse beam 55 is so high is so that it clears, as the carriage inclines, the top of any tall object of freight on the floor 18 and near the cab 14.

FIGS. 4, 5, and 6 show the steps for mounting an attachment 56 onto the inclinable carriage 20 of this invention. The attachment can be a shell having a bed and sidewalls so that mounting of the attachment on the truck converts the truck to a dump truck. Alternatively, the attachment 56 can be a boxlike shell structure which converts the truck into a van when mounted. The attachment 56 can further be a large object of freight.

A coupling means for the most part is a permanent part of the attachment. The coupling means accommodates the attachment to the carriage, so that the construction of the coupling means may vary with the attachment. FIG. 4 shows a coupling means 57 for the attachment 56. In this case, the coupling means includes base 58, vertically disposed legs 60 below the base, and casters 62 at the bottom of the legs. Alternatively, base 58 can be a pair of beams coupled to the sockets 48. Stakes 63 at the left end of the base 58 extend toward the rear sockets 48 of the carriage 20. A post 64 stands at each right corner of the base 58. Alternatively, the posts 64 can be a supporting wall or any other structure which provides lateral support for the attachment 56. At the top of each post 64 is a beam 65 having a stake 66 that couples to a respective socket 48 at the front of the carriage 20.

The attachment 56 rests with the coupling means 57 at the rear of the truck before mounting. During mounting, the hydraulic cylinders 24 incline the carriage 20 to its vertical position to facilitate alignment of the stakes 63 of the coupling means 57 with the mating sockets 48 of the carriage 20. If the casters are lacking, the truck alone must move to effect the alignment and the mounting. After the stakes 63 and 66 couple into sockets 48, the hydraulic cylinders incline the carriage and the attachment coupled thereto into the horizontal position shown in FIG. 6.

Immediately after the operation shown in FIG. 4, the attachment 56 with coupling means 57 still rests on the ground and not yet on the truck. FIG. 5 shows the carriage with the attachment 56 and the coupling means 57 inclined just enough so that the truck carries the entire weight of the attachment and the coupling means. The suspension springs (not shown) of the truck are consequently compressed, so that the chassis is closer to the ground than it is in FIG. 4. One of the pairs of casters 62 still touches the ground. In the transition between FIGS. 4 and 5, either the truck's wheels or the casters or both rolled.

If the center of gravity of the attachment 56 is to the right of the lower stakes in the view of FIG. 4, the upper stakes and sockets should be fastened together before the inclining movement of the carriage begins. Otherwise, the moment caused by the weight of the attachment will rotate the attachment clockwise instead of in the direction of the carriage, counterclockwise, and the upper stakes will pull out of their sockets.

In FIG. 6, the mounting is complete. The carriage 20 and the attachment 56 are in the horizontal position, the position in which transportation takes place. All of the energy for mounting came solely from the motion of the inclining carriage. No other actuators take part.

Figure 8:
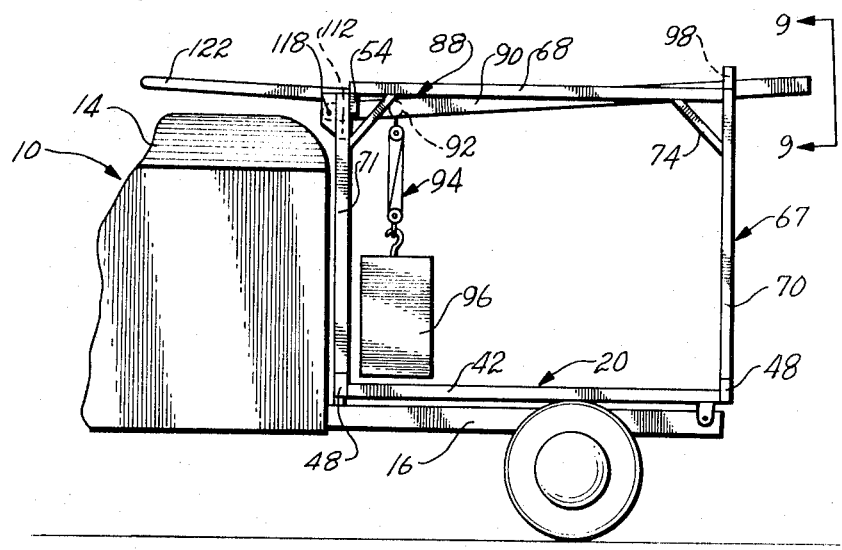
FIG. 8 shows a side-elevational view of a truck with an overhead track and trolley assembly and coupling means of this invention.

FIGS. 7 and 8 show the truck 10 equipped with an alternative preferred form of the coupling means of this invention. In these views, the coupling means mounts on the carriage 20 of FIG. 1 with its stakes in the carriage's sockets 48. The coupling means is shown as a skeleton frame 67 comprising a pair of overhead longitudinal beams 68 equivalent to the beams 64 of the coupling means shown in FIGS. 4–6, a pair of rear posts 70 equivalent to the base 58 shown in FIGS. 4–6, a pair of forward posts 71 equivalent to posts 65 shown in FIGS. 4–6, a front transverse beam 72 connecting the tops of posts 71, braces 74, and sufficient other structural members (not shown) to make a light, rigid structure. The skeleton frame 67 of FIG. 7 includes a rear transverse beam 75 connecting the tops of the rear posts 70. FIG. 9, discussed later, shows an alternative to the transverse beam 75. The skeleton frame mounts on the carriage 20 in the same manner as the coupling means 57 and the attachment 56 described in FIGS. 4, 5, and 6. Alternatively, the skeleton frame 67 can comprise the structure of the coupling means 57 shown in FIGS. 4–6 with the legs 60 and casters 62 removed, since these components may be demountable.

An attachment to the truck 10 is an overhead rack 76 which mounts on top of the skeleton frame 67, as shown in FIG. 7. The rack is used for transporting long objects of freight (not shown), such as ladders, planks, and lengths of pipe. Manually loading freight into the rack is relatively easy because the rack's rear end is near the ground when the carriage is in the inclined position shown in FIG. 10. The rack preferably includes a pair of side members or walls 78, a deck 80, and a truss 82 cantilevered over the cab 14. An adjustable rear wall 84 prevents the objects of freight from sliding out of the rack when the carriage is in an inclined position. Because of spatial restrictions on the demounted, vertical, position of the attachment, a fixed rear wall on the mounted, horizontal, position of the attachment can be at most only a short distance beyond the rear of the carriage. A location of the rear wall farther rearward is better because it lets the rack accommodate longer objects of freight as well as brings the rack's rear end closer to the ground for a given inclination of the carriage. Hence, there are two primary locations of the rear wall, one for the demounted and the other for the mounted position of the attachment, and bolts and wingnuts 86 are hardware for locating the rear wall in either of these two locations.

A further attachment to the truck 10 is a track and trolley assembly 88 which mounts on top of the skeleton frame 67, as shown in FIG. 8. In a further modification of the invention, the track and trolley assembly 88 mounts on the skeleton frame 67 in combination with the overhead rack 76, as seen in FIGS. 10 and 11. The track and trolley assembly 88 is basically similar to that installed on a conventional truck. Its essential components are a longitudinal centrally disposed overhead track 90, a trolley 92 on the track, and a rope or chain hoist 94 suspended from the trolley for handling an object of freight 96. Instead of the permanently and rigidly secured transverse beam 75 discussed in connection with the overhead rack shown in FIG. 7, the track 90 as FIG. 9 shows, can releasably fasten to the rear of the skeleton frame 67 using a transverse beam 98 with sockets 100 at its ends fitted over stakes 102 at the top of the rear posts 70. Each rear post 70 has a laterally projecting triangular brace 104, and each end of the transverse beam 98 has a similar downwardly projecting triangular brace 106. When the beam 98 fastens to the top of posts 70, the braces 104, support the braces 106 to provide a rigid structure. A toggle clamp 108 at the bottom of each brace 106 hooks into a socket 110 on each brace 104. The rear of the track 90 bolts to the underside of the transverse beam 98 at its center. The front of the track 90 fastens to the top of a transverse beam 112. An adjustable lateral stop 114 preferably at each end of the track prevents the trolley from leaving the track.

The track and trolley assembly of this invention and a conventional installation of the track and trolley assembly serve the same purpose but function somewhat differently. Both installations require the truck to maneuver so that its rear is in correct relationship to an object of freight 96, FIG. 10, resting on the ground. Both installations at this time require the hoist 94 to be at the rear of the track 90. Both installations then require a lower block 116 of the hoist 94 to lower the object 96 for hooking onto it, but they do so differently. The conventional installation lowers the block by using the internal mechanism of the hoist itself, whereas the present invention contemplates inclining the carriage 20, thereby lowering the rear end of the track 90, the trolley 92, and the hoist 94 as a unit. Two advantages of the invention are now evident. The first is that inclining the carriage extends the rear end of the track farther rearward, as FIG. 10 shows, so that the track in the invention need not extend far past the rear end of the truck. The second advantage is that the invention raises the object 96 merely by returning the bed to the horizontal position whereas the conventional installation requires the conventional operation of the hoist, either by manual effort or by auxiliary electric power.

In the preferred form of the invention, the track 90 slopes down toward the front end of the truck. An advantage of this slope is that it makes it possible to level the track if the truck is on a grade so that pushing the trolley loaded with the object 96 uphill is never necessary. In fact, it is possible to slope the track so that gravity rolls the loaded trolley. The position of each of the stops 114 is adjustable, and the stops can be used to restrict the travel of the trolley to position the object 96 at a chosen location on the floor 18. FIG. 8 shows the object 96 in a location adjacent to the rear of cab 14.

Unloading the truck with the reverse of this procedure is even simpler than loading. If there is no slack between the lower block 116 and the object 96, inclining the carriage will, in one continuous operation, lift the object from the floor 18, roll it to the rear of the track 90, place it on the ground 12, and relieve the tension on the hoist 94.

FIG. 11 illustrates an optional feature of the skeleton frame 67 that allows the truck to simultaneously accommodate the improvement of the tailgate lift described in the copending U.S. application Ser. No. 749,358, filed Aug. 1, 1968. The rear transverse beam 98 uncouples from the rear posts 70 of the skeleton frame 67, and the integrated rack 76 and track and trolley assembly 88 is then free to rotate about a pivot pin 118 at the front of the skeleton frame. A demountable snubbing line 120, connecting a point on the truss 82 well forward of the pivot pin 118 to a point on the chassis 20 just behind the cab 14, pulls down on the integrated rack and track and trolley assembly as the carriage 20 inclines to the vertical position. Consequently, when the carriage reaches its vertical position, the integrated rack and track and trolley assembly is at a lesser angle, clearing the rear of the truck for access to the tailgate lift. The construction of the rear of the skeleton frame 67 also allows this access. The rear wall 84 of the rack 76 is still effective in preventing the contents of the rack from sliding out. If the only attachment is the track and trolley assembly, i.e., no rack, and hence no truss 82, a simple boom 122 rigidly attached to the front of the track and cantilevered over the cab 14 can substitute for the truss for the purpose of the snubbing line 120.

I claim:

1. An improved truck for mounting, demounting, and transporting an overhead rack attached to the truck for objects of freight, the truck comprising:

a. a carriage pivotally mounted on the truck chassis, the pivot for the carriage being near the rear end of the chassis;

b. means for inclining the carriage about its pivot between a horizontal position, substantially parallel to the chassis, and a substantially vertical position; and c. coupling means secured to the rack and adapted to fasten the rack to the carriage when the carriage is in a substantially vertical position, the rack having a rear wall for preventing objects from sliding out of the rack when the carriage is in an inclined position; such that the rack can be aligned with the vertically positioned carriage, coupled thereto, and mounted into a position for transportation by inclining the carriage into the horizontal position.

2. The improvement according to claim 1 wherein the rear wall of the rack is adjustable to allow an extension of the rack to accommodate long objects of freight.

3. The improvement according to claim 1 wherein the rack is pivotally secured to coupling means at the front of the carriage; and the improvement additionally includes a snubbing line secured to a point on the rack forward of its pivotal connection for use in preventing the rack from inclining to a vertical position with the carriage.

4. An improved truck for mounting, demounting, and transporting an overhead longitudinal track attached to the truck, the truck comprising:
  a. a carriage pivotally mounted on the truck chassis, the pivot for the carriage being near the rear end of the chassis;
  b. means for inclining the carriage about its pivot between a horizontal position, substantially parallel to the chassis, and a substantially vertical position; and
  c. coupling means secured to the track and adapted to fasten the track to the carriage when the carriage is in a substantially vertical position, the track carrying a trolley and a hoist supported from the trolley for hoisting objects onto the truck from the ground in response to the inclining of the carriage;

such that the track can be aligned with the vertically positioned carriage, coupled thereto, and mounted into a position for transportation by inclining the carriage into the horizontal position.

5. The improvement according to claim 4 wherein the track slopes down toward the front of the carriage.

6. The improvement according to claim 4 including attachment coupling means at the front of the carriage, the front of the track being pivotally secured to the attachment coupling means; and the improvement additionally includes a snubbing line secured to a point on a rigid extension of the track forward of its pivotal connection for use in preventing the track from inclining to a vertical position with the carriage.

7. The improvement according to claim 6 wherein the track includes a lateral beam releasably secured to the rear of the track and fastened at its ends to the coupling means.

* * * * *